Figure 1:
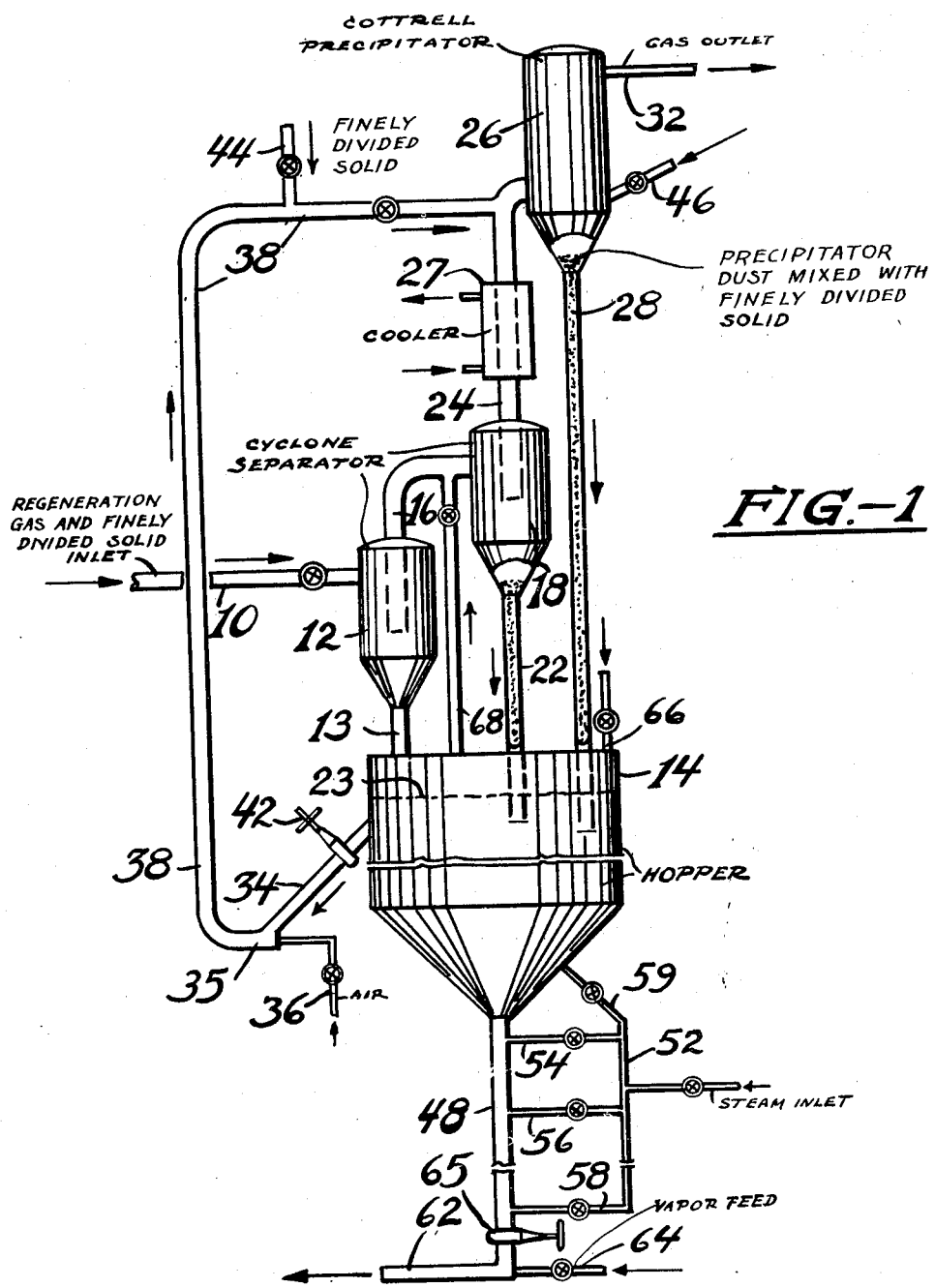

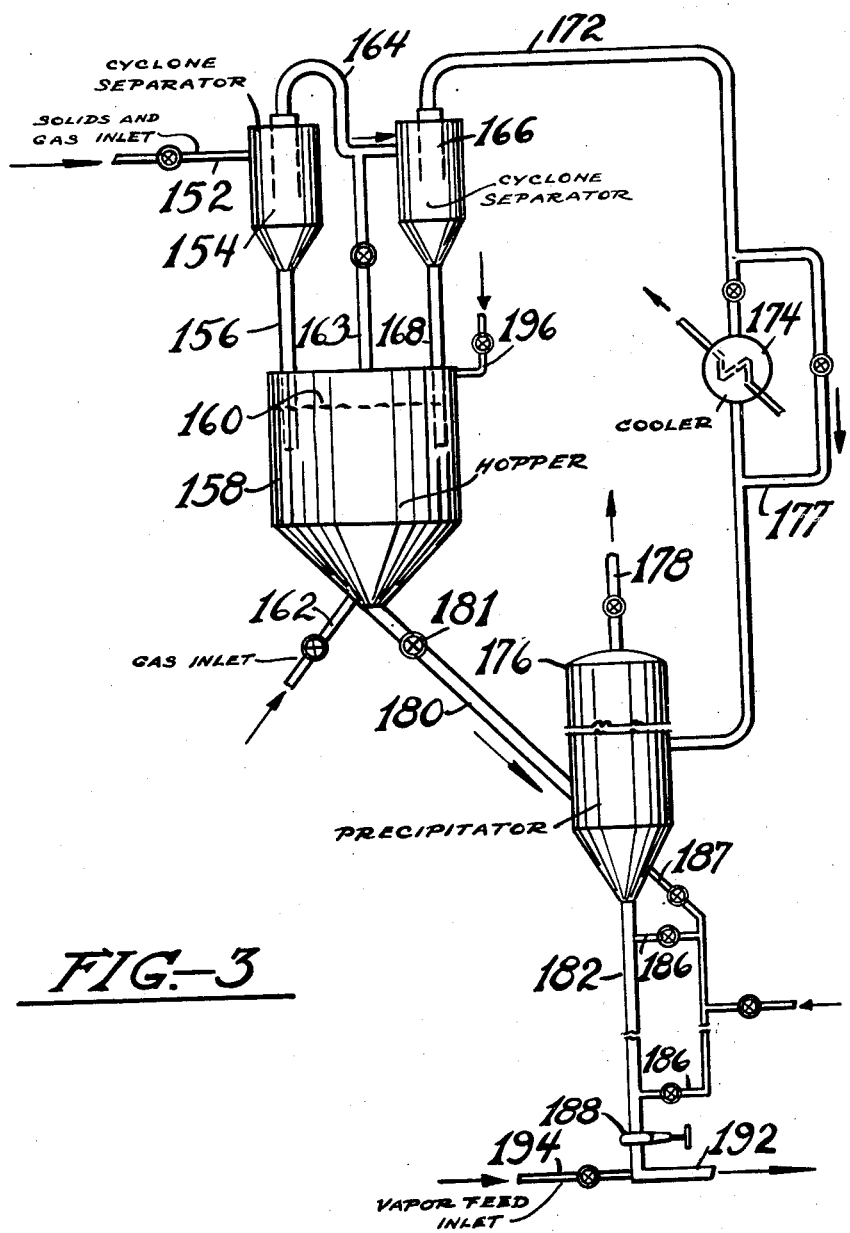

Patented Oct. 17, 1950

2,526,486

UNITED STATES PATENT OFFICE 2,526,486

HANDLING PULVERULENT CATALYST IN HYDROCARBON CONVERSION AND CATALYST REGENERATION OPERATIONS

Robert W. Krebs, Baton Rouge, La., assignor to Standard Oil Development Company, a corporation of Delaware Application July 12, 1941, Serial No. 402,193

15 Claims. (Cl. 196—52)

This invention relates to conveying or handling powdered or finely divided materials and more specifically relates to conveying powdered or finely divided catalyst particles in the catalytic treatment of hydrocarbons.

In the catalytic treatment of hydrocarbons such as the catalytic conversion of hydrocarbons, either to higher or lower boiling hydrocarbons, one method comprises mixing finely ground or powdered catalytic material with hydrocarbon vapors heated to conversion temperature, passing the mixture through a reaction zone wherein it is maintained for a sufficient time to effect the desired extent of conversion of the hydrocarbons and then separating the resulting mixture into solid catalyst particles and reaction products in vapor form. Preferably the catalyst particles are separated from the reaction products or products of conversion while the products of conversion are at an elevated temperature so that there is substantially no condensation of any constituents and a dry separation is effected between the vaporous constituents and the solid particles.

In order to recover most of the powdered catalyst particles preferably a plurality of separating zones or means is provided. For example, the products of conversion and catalyst particles are first passed through a separating means such as a cyclone separator to separate a large part of the powdered catalyst. Then the separated vapors are passed through another separating means such as a cyclone separator to separate further quantities of powdered catalyst from the vapors. If desired, the separated vapors may then be passed through an additional separating means such as a cyclone separator and/or through an electrical precipitator to remove substantially all of the powdered catalyst from the vapors.

After the catalyst particles have been passed through the reaction zone, it is necessary to regenerate them to remove deposited carbonaceous material resulting from the conversion in the reaction zone. The catalyst particles are preferably regenerated as a suspension in a gas such as steam or flue gas free of oxygen and passed through a regeneration zone in the presence of air or oxygen to burn off the carbonaceous deposit. It is essential that the temperature be controlled during regeneration in order to prevent sintering or fusing of the catalyst particles. After regeneration, the catalyst particles are separated from the regeneration gases by a plurality of separating means such as cyclone separators and the last separating means is preferably an electric precipitator to remove catalyst fines.

In each succeeding separating step the recovered catalyst particles are smaller, that is, the largest particles are removed from the vapors or gases in the first separating stage and the smallest particles are removed in the last separating stage. The separated catalyst particles are allowed to drop into a hopper or the like after which they are used for any further treatment desired. It has been found that it is difficult to convey the very fine particles separated in the last stage or latter stages of separation, particularly the very fine particles separated in the electric precipitator. These fine particles have a tendency to bridge adjacent the outlets of hoppers and do not flow through pipes very readily.

In another process for the catalytic treatment of hydrocarbons the catalyst particles in finely divided form are aerated or fluidized, that is, they are mixed with the gas and the resulting aerated mass acts as a fluid which can be fed to a reaction zone by the hydrostatic head of pressure produced by a column of the fluidized catalyst. Here again it has been found that the exceedingly fine catalyst particles separated in an electrical precipitator or in the last stages of cyclone separation do not aerate and it has not been possible to aerate these fine particles to convey them to a desired point or to return these fine particles to a hopper as an aerated stream.

According to my invention, the catalyst fines or other exceedingly fine particles which are hard to aerate and which tend to bridge in containers or pipes are mixed with a small amount of coarse particles of the same or other material to facilitate the flow of the fine particles through pipes and from containers or hoppers.

In one form of the invention, solid particles suspended in a gas are passed to a first separating means to separate solid particles from the gas. The separated particles are introduced into a main hopper. The gas separated from the solid particles in the first separating means still contains solid particles and it is preferably introduced into a second separating means for separating an additional quantity of solid particles from the gas. The solid particles are delivered to the same hopper into which the particles from the first separating means are delivered.

The gases from the second separating means still contain solid particles but the solid particles are much smaller than the particles removed in the first and second separating means. A third separating means may be used. The fine particles remaining in suspension after passing through the separating means are preferably separated in an electric precipitating means. These separated fine particles, however, are more difficult to handle than the coarser particles and they have a tendency to bridge the outlet from the bottom of the electric precipitating means and also these fine particles do not flow as readily as the larger or coarser particles. In order to handle these particles more easily, a portion of the coarser particles from the main hopper is suspended in gas and introduced into the lower part of the electric precipitating means for admixture with the fine particles. The resulting mixture has better flow characteristics than the fine particles and also may be fluidized whereas it is practically impossible to fluidize the fine particles from an electric precipitating means. The mixture of fine particles and coarser particles is returned to the main hopper.

In another form of the invention the solid particles in a gaseous suspension are introduced into a first separating means to separate a large percentage of the solid particles from the gas, the gas passing to a second separating means. The separated solids in the first separating means are introduced into a main catalyst hopper. The second separating means separates an additional quantity of solid particles from the gas. The solid particles from the second separating means are introduced into the main hopper and the gas is preferably passed to an electric precipitating means for separating fine particles from the gas.

The fine particles separated in the precipitating means are difficult to fluidize or aerate and in addition have a tendency to bridge over the outlet of containers from which the fine particles are withdrawn. In order to improve the flow characteristics of the fine particles, a portion of the coarser solid particles from the main hopper are introduced by gravity directly into the lower portion of the electric precipitating means. The resulting mixture of fine and coarser particles has better flow characteristics than the fine particles and also may be aerated to form a fluidized stream.

The mixture is introduced into a standpipe where it is maintained in a fluidized or aerated condition and then passed to one of the separating means for separating solids from gas and the solids are introduced into the main hopper.

In another form of the invention the gaseous suspension of the solid particles is passed through a plurality of separating means as above described and the solid particles are introduced into a main hopper. The gases containing the fine solid particles are introduced into an electric precipitating means for separating the fine particles from the gas. In this form of the invention all of the coarser or larger solid particles from the main hopper are introduced into the lower portion of the electric precipitating means or into the hopper directly below the electric precipitating means for admixing all of the coarser solid particles with the fine particles. The mixture of coarser and fine particles is then withdrawn from the bottom of the electric precipitating means and from there withdrawn and carried to any desired point.

In the catalytic conversion of hydrocarbons to form either higher or lower boiling hydrocarbons the solid particles are catalytic and the mixture of coarse and fine particles is introduced into a standpipe where it is aerated to form a fluidized mass. The fluidized mass in the standpipe creates a pressure which is used to introduce the catalyst particles into a mixing zone where they are mixed with hydrocarbon vapors and the resulting oil-catalyst suspension is introduced into a desirable conversion zone.

In the previous form of the invention where hydrocarbons are converted catalytically into either higher or lower boiling hydrocarbons, the standpipe for withdrawing catalyst particles for a hydrocarbon conversion is connected to the bottom of the main hopper. The catalyst particles are fluidized in the standpipe and then mixed with oil vapors and passed to a conversion zone. In the last form of the invention described, the standpipe for the main hopper is eliminated and the standpipe is associated with the electric precipitating means.

While catalytic conversion of hydrocarbons has been particularly referred to above, it is to be understood that my invention is not to be restricted thereto as in its broader aspects my invention may be used for mixing materials which cannot be aerated with coarser materials which can be aerated so that the resulting mixture can be aerated and formed into a fluidized mass.

Figure 2:
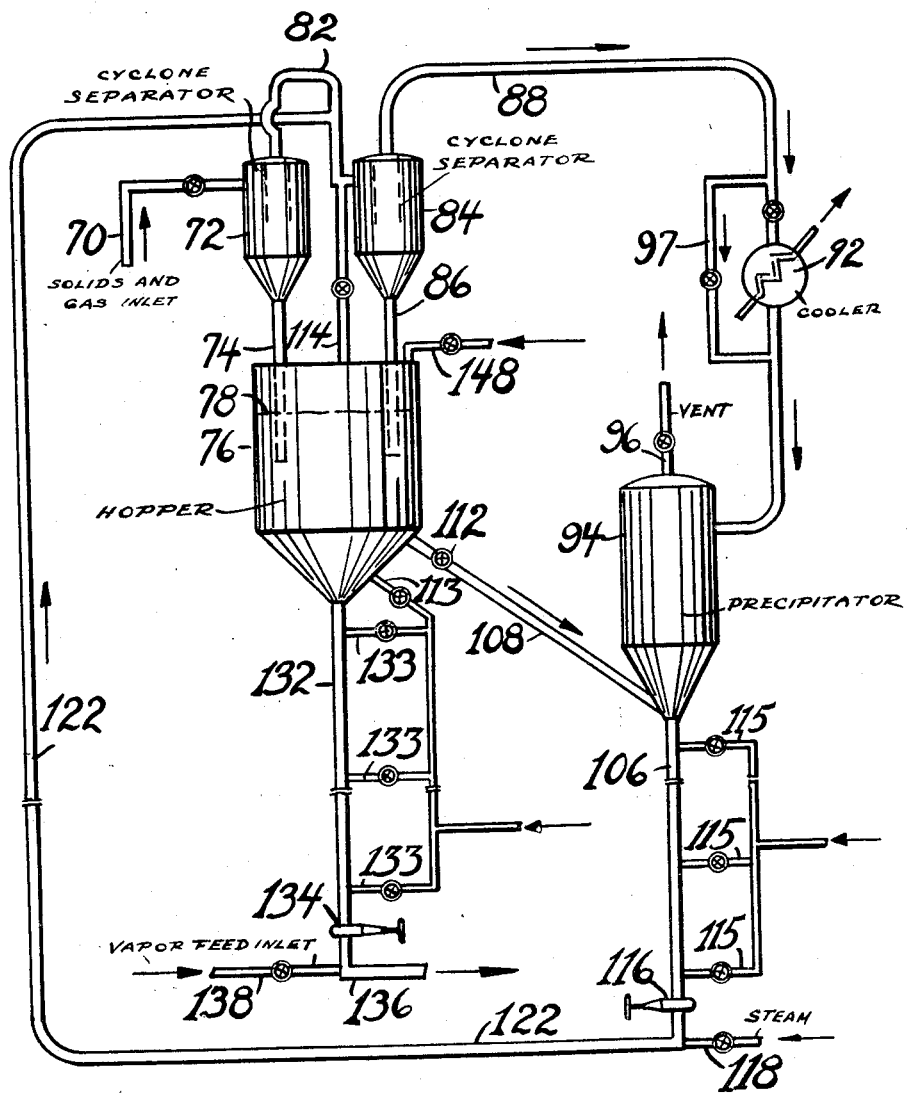

In the drawing:

Figure 1 diagrammatically represents one form of apparatus for carrying out the preferred form of my invention; and Figures 2 and 3 represent other forms of apparatus for carrying out my invention.

Referring now to Figure 1 of the drawing, the reference character 10 designates a line for conveying regenerated catalyst particles and regeneration gases. It is to be understood that the catalyst particles have been previously used in a treating process during which the catalyst particles became fouled with carbonaceous material and this carbonaceous material was burned off the catalyst particles in any suitable manner. The suspension of the catalyst particles in the regeneration gases passes through the line 10 to a separating means 12 of any suitable construction. For example, a cyclone separator such as shown in the drawing may be used.

In the separating means 12 there is a preliminary separation between solids and gases, the solids dropping into the bottom of the separating means and passing through line 13 to a catalyst hopper 14. The solid particles separated in the first separating means 12 contain most of the largest particles in the suspension.

The separated gases still contain appreciable amounts of solid particles and are passed through line 16 to a second separating means 18 of any suitable construction. Preferably, a cyclone separator is used in the second separating step. The solids separated in the separating means 18 drop into the bottom of the separating means and are conducted to the hopper 14 by means of the depending pipe 22 which extends below the surface 23 of the catalyst particles in the hopper 14. The particles separated in the second separating step are of a smaller size than those separated in the first separating means 12.

The separated gases still contain appreciable amounts of solid particles and these gases pass overhead through line 24 to a third separating means 26 which may be of any suitable construction but which is preferably an electrical precipitator, such as a Cottrell precipitator. If desired, another cyclone separator may be included ahead of the electric precipitator. The separating means 26 is adapted to remove substantially all of the solid particles from the gaseous stream. Before being passed to the electric precipitator 26, the gaseous stream is preferably passed through cooler 27. The solid particles separated by the separating means 26 are exceedingly fine and it has been found that these fine particles tend to bridge at the outlet from the separating means 26 and do not flow readily through a pipe or return conduit. The separating means 26 is provided with a return conduit 28 which extends below the level 23 of the catalyst particles in the hopper 14.

As above pointed out, the catalyst particles separated in the last separating means 26 are not easily conveyed and while certain sized solid particles may be aerated to cause them to flow as a fluid, these exceedingly fine particles leaving the electrical precipitator do not readily aerate and it has not been possible to fluidize these exceedingly fine particles to facilitate their return to the hopper 14 or other container.

I have found that these exceedingly fine particles may be more easily conveyed and handled if they are mixed with a relatively small amount of coarser particles. In the specific form of the invention disclosed in Figure 1, coarser catalyst particles or solid particles are withdrawn from the hopper 14 through an inclined pipe 34 and fed to a mixing zone 35 wherein the coarse particles are mixed with air or other suitable gas introduced through line 36. The suspension of coarse catalyst in gas is then passed through line 38 and is mixed with the gases leaving the second separating means 18 by means of line 24. The mixture of coarser particles and relatively fine particles is introduced into the electrical precipitator 26 and the coarse particles and exceedingly fine particles are precipitated as a mixture. The coarse particles render the mixture flowable. Without aeration the mixture of coarse particles and fine particles flows from the precipitator 26 without bridging and without plugging the line 28. In some instances the mixture may also be aerated to fluidize the mass and to cause it to flow back to the hopper 14 more readily. It is to be noted that the catalyst or solid particles withdrawn by line 34 from the hopper 14 are those catalyst particles or solid particles near the outlet of the first separating means 12 and comprise the larger or coarser solid particles. Being introduced into the gaseous stream containing the exceedingly fine particles, the suspension of coarser particles acts as a scrubbing means to assist in the removal of the catalyst or solid particles from the gases. Preferably, a slide valve 42 is provided for the withdrawal pipe 34.

While Figure 1 of the drawing describes withdrawal of solid coarse particles from the hopper or container 14, it is within the contemplation of the invention to close the slide valve 42 and to introduce coarse solid particles into the line 38 by means of line 44; or the coarse solid particles may be introduced into the lower portion of the precipitator 26 by means of a line 46. The coarse solid particles introduced either through line 44 or 46 may be the same material as the exceedingly fine solid particles or they may be other material which is of a large size than the fine particles and which is substantially inert with respect to the fine solid particles. The coarser particles introduced through line 44 or line 46 may be added as powdered material but are preferably added as a suspension in a gas. The coarse particles may be taken from pipe 13 from the first cyclone and introduced into separator 26 or into line 38.

When the process used is a catalytic conversion of hydrocarbons, the particles in the hopper 14 will be catalyst particles. Any suitable catalyst may be used such as activated clay or synthetic catalysts containing alumina and silica. The catalyst particles pass downwardly in the catalyst hopper 14 and are withdrawn therefrom through a line 48. In cases where the line 48 constitutes a standpipe in which the catalyst particles are maintained as a fluidized mass, means including manifold 52 and branch lines 54, 56 and 58 are provided for injecting a substantially inert gas such as steam into the mass of catalyst in the standpipe to aerate the mass and provide a fluid-like mixture. Another branch line or lines 59 is provided for fluidizing the catalyst particles in the bottom portion of hopper 14.

The fluid-like mixture provides a head of pressure for introducing the catalyst into a mixing zone 62 where it is mixed with hydrocarbon vapors or gases introduced through line 64. The catalyst-oil suspension is then passed to a suitable conversion zone. Preferably the bottom of standpipe 48 is provided with a valve 65 for controlling the outflow of catalyst to zone 62. Fresh catalyst may be introduced into hopper 14 by means of line 66. A line 68 is provided for removing aeration gas from hopper 14. Line 68 communicates with line 16 between the first separating means 12 and the second separating means 18 so that the removed gas is passed through separating means 18.

The exceedingly fine particles which are recovered in the electrical precipitator 26 have a particle size largely between about 0 and 20 microns and, as I have pointed out, because of their exceedingly small size they flow with difficulty through pipes and tend to bridge in containers or hoppers.

I have found that if the exceedingly fine catalyst particles having a particle size below about 20 microns are mixed with a relatively small amount of coarser catalyst particles larger than about 40 microns, the mixture may be more easily handled and may flow as a fluidized mass. For example, the coarse particles to be used in mixing with the fines may contain particles of a size from about 0 microns to 100 microns with about 70% by weight being over 40 microns.

The amount of coarser catalyst particles to be used with the exceedingly fine catalyst particles is about 50% to 100% by weight of the coarser catalyst particles with respect to the exceedingly fine catalyst particles. Where the exceedingly fine catalyst particles contain about 70% of less than about 20 microns, about the same or slightly smaller proportion of coarser catalyst particles as above given may be used to provide a mixture which flows more easily.

The form of the invention shown in Figure 2 will now be described. Solid particles in a gaseous suspension are passed through line 70 and introduced into a first separating means 72 which may be a cyclone separator. The solid particles in the gaseous suspension may be any suspension of solids but in the specific form of the invention the suspension comprises regenerated catalyst particles in the regenerating gas.

In the first separating means 72 the larger solid particles are separated and are withdrawn from the bottom of the separating means 72 and passed through line 74 into a main hopper 76, the pipe or line 74 preferably extending below the surface 78 of the solid particles in the main hopper.

The gases separated in the first separating means 72 still contain appreciable amounts of solid particles and these gases are passed through line 82 to a second separating means 84 which may be a cyclone separator. In the second separator 84 smaller solid particles are separated and are withdrawn from the bottom of the second separator 84 through line 86 which extends into the main hopper 76 and below the level of the solid particles in the hopper.

The separated gases leaving the second separator 84 through line 88 still contain solid particles which are relatively fine and a third separating means may be used, if desired. To separate these fine particles from the suspension leaving the second or third separating means an electric precipitating means is used. Where the gases containing the fine particles are hot, the suspension may be passed through a cooler 92 before being introduced into the electric precipitating means 94. In the electric precipitating means the fine solid particles are removed from the gas, the separated gas being passed through outlet 96. If the gases in line 88 are cool, the cooler 92 is by-passed by means of line 97.

The solid fine particles collecting in the bottom of the electric separating means 94 are withdrawn therefrom and introduced into a standpipe 106. As above pointed out, the fine solid particles separated in an electric precipitating means do not flow readily and cannot be aerated or fluidized. In order to improve the flow characteristics of the fine solid particles, a portion of the coarser or larger solid particles from the main hopper 76 are withdrawn from the main hopper through line 108 and introduced into the lower portion of the electric precipitating means 94 for mixing the larger or coarser solid particles with the finer particles. The line 108 is provided with a valve 112. The catalyst or other solid particles in the bottom of hopper 76 are aerated or fluidized by the introduction of a fluidizing gas such as steam through line 113. A line 114 is provided for removing aerating gas from hopper 76 and passing it to line 82 and second separator 84.

The mixture of the coarser and fine particles is introduced into the standpipe 106 where it is aerated or fluidized by the introduction of steam or other suitable gas. The steam or other suitable gas is introduced into the standpipe at spaced points through lines 115. The bottom of the standpipe 106 is provided with a slide valve or other suitable valve 116 for controlling the amount of solid particles withdrawn from the standpipe 106.

From the bottom of the standpipe 106, the solid particles are suspended in steam, or the like, introduced through line 118 and the suspension is passed through line 122 to line 82 leading to the second separator 84 and mixed with the suspension passing to the second separator 84.

The solid particles are withdrawn from main hopper 76 in any desired manner and transferred to any point desired. In the catalytic conversion of hydrocarbons to make either higher or lower boiling hydrocarbons the solid particles are catalytic and are preferably withdrawn from the main hopper into a main standpipe 132. The catalyst particles in the standpipe 132 are fluidized by introducing steam or other inert gas into the standpipe through lines 133 arranged at suitable spaced points along the length of the standpipe. The fluidized catalyst particles are withdrawn from the bottom of the standpipe 132, the flow of the fluidized mass from the standpipe being regulated by a slide valve or other suitable valve 134 arranged at the bottom of the standpipe.

The catalyst particles in fluidized form are introduced into a mixing zone 136 wherein they are mixed with hydrocarbon vapors introduced into the mixing zone through line 138 and the hydrocarbon catalyst mixture is then passed to a suitable conversion zone. During conversion, the catalyst particles become coated with carbonaceous deposits and general practice is to regenerate the catalyst particles, preferably by burning off the carbonaceous deposits and the regenerated catalyst particles and regenerating gases are then treated to separate solid regenerated catalyst particles from regenerating gases. The form of the invention shown in Figure 2 or Figures 1 and 3 may be used for carrying out this separation.

A valved inlet pipe 148 is provided for main hopper 76 for introducing fresh catalyst or solid particles into the main hopper 76.

Referring now to the form of the invention shown in Figure 3, a gaseous suspension of solid particles is passed through line 152 to a first separating means 154 for separating solid particles from gases. The solid particles are withdrawn from the separating means 154 and passed through line 156 into a hopper 158. The pipe or tube 156 extends below the surface 160 of the solid particles in the hopper 158. Aerating or fluidizing gas is preferably introduced into the bottom of hopper 158 through line 162 to fluidize the solid particles therein. A line 163 is provided for removing aerating gas from the top of hopper 158 to line 164 and to second separating means 166.

The gases leaving the first separating means are passed through line 164 to a second separating means 166 for separating additional quantities of solid particles from gases. The separated solid particles are collected in the bottom of the separating means 166 and withdrawn therefrom and introduced into the hopper 158 through a pipe or line 168 which extends below the surface 160 of the solid particles in the hopper 158. The gases separated in the second separating means 166 still contain solid particles which are finer than those separated in the first and second stages and these gases are passed through line 172 and cooler 174 and then introduced into an electric precipitating means 176. Another separating means may be used ahead of precipitating means 176, if desired. Where the gases leaving the second separating means 166 are at a relatively high temperature, the cooler 174 may be used. However, where the gases are at a relatively low temperature, the cooler 174 may be omitted and the gases passed through by-pass line 177.

The electric precipitating means 176 acts to remove fine solid particles from the gas and the separated gas is passed through an outlet 178. The separated fine solid particles accumulate in the bottom of the separating means 176 or in a hopper below the electric precipitating means 176. As above pointed out, these fine particles have very poor flow characteristics, are difficult to aerate and tend to bridge-over in outlet passages from hoppers or other containers. In order to improve the flow characteristics of the fine solid particles, the larger or coarse particles collected in hopper 158 are withdrawn through line 180 having valve 181 and introduced into the bottom of the electric precipitating means 176 for mixing the fine solid particles with the coarser or large particles. The resulting mixture is introduced into a standpipe 182 wherein the solid particles are fluidized by the introduction of steam or other suitable inert gas through lines 186. The solid particles in the bottom of the precipitator 176 are preferably fluidized by introducing fluidizing gas through line 187. The bottom of the standpipe 182 is provided with a slide valve or other suitable valve 188 for regulating the flow of the fluidized mass from the standpipe.

Where the form of the invention shown in Figure 3 is used for the catalytic conversion of hydrocarbons either to higher or lower boiling hydrocarbons, the solid particles are catalyst particles and the fluidized mass is introduced into a mixing zone 192 where the catalyst particles are mixed with hydrocarbon vapors or gases introduced through line 194 and the resulting hydrocarbon catalyst mixture passed to a suitable conversion zone.

In the form of the invention shown in Figure 3, it will be seen that the solid particles from the hopper 158 are all introduced for admixture with the fine particles separated in the electric precipitating means and the resulting mixture passed to a standpipe. Comparing Figure 3 with the apparatus shown in Figure 2, it will be seen that in Figure 2 the main catalyst hopper 76 is provided with a standpipe 132 and the electric precipitating means 94 is provided with a standpipe whereas in the form of the invention shown in Figure 3 there is only one standpipe which is associated with the electric precipitating means 176, the standpipe associated with the hopper 158 having been eliminated.

Or, in Figure 1 a portion of the coarse catalyst or other solid particles from separator 12 passing through line 13 may be mixed with extremely fine solid particles separated in precipitator 26. Also in addition or instead of the coarse particles from separator 12, I may use the relatively coarse particles from the second separator 18 passing through line 22 and mix them with the extremely fine particles separated in precipitator 26. In some instances it may be necessary to add a hopper under the precipitator 26 and separated therefrom by a suitable valve to take care of differences in the pressure of the various streams.

The levels of the solid particles in the pipes 22 and 28 are shown. This difference in level is due to the lower pressure existing in separator 26 and the head of particles in pipe 28 is necessary to return the particles to the hopper 14. Pipe 28 is made longer than pipes 22 and 13 to compensate for the lower density of the particles in pipe 28 and the greater pressure differential which must be counteracted by the head of catalyst.

While the drawing describes apparatus for separating solid particles from a gaseous suspension thereof and mixing a part of the coarser particles with the exceedingly fine particles separated in the last separating means, and while the specific form of my invention has been described in connection with catalytic conversion or treatment of hydrocarbons, it is to be expressly understood that the drawing and description are by way of example only and that my invention is not to be restricted thereto but may also be used to more easily convey or handle exceedingly fine solid particles by admixing therewith coarser solid particles, whereby the resulting mixture will flow through pipes more readily and will not bridge the outlets of containers or hoppers, and will in general be more easily handled.

Instead of using an electric precipitator as the last separating means, a cyclone separator may be used for separating fines which are mixed with coarser or larger particles as above described.

While my invention has specifically referred to regenerated catalyst particles suspended in regenerating gases, it is to be understood that my invention may also be used to separate catalyst particles from reaction products leaving a reaction zone, such as a conversion zone.

I claim:

1. Process of maintaining a fluidized mass of finely divided solids serving as a source of supply for a chemical reaction, comprising continuously introducing into the mass a stream of fluidizing gas, supplying said mass with said solids as separate streams in varying degrees of subdivision including particles of extreme fineness, and mixing a portion only of the particles of said solids larger than said particles of extreme fineness with said particles of extreme fineness, prior to their discharge to said chemical reaction, whereby the flow characteristics of said particles of extreme fineness are improved and the maintenance of the mass in fluidized condition is facilitated.

2. Process according to claim 1, in which the main fluidized mass receives solids larger than said particles of extreme fineness, and solids from said mass are passed into contact with said particles of extreme fineness to form a separate fluidized mass.

3. Process according to claim 1, in which said particles of extreme fineness are carried by a gas stream, a portion of said mass containing particles larger than those of extreme fineness is passed into admixture with said particles of extreme fineness, and the gas stream containing the particle mixture is then subjected to electrical precipitation.

4. Process according to claim 1, in which the particles of extreme fineness are between about 0–20 microns in diameter.

5. Process of maintaining a fluidized mass of finely divided catalytic material to be used as a source of supply of catalyst for the conversion of hydrocarbon oils, comprising continuously introducing into the mass of catalyst a stream of fluidizing gas, recovering catalyst carried off by said gas, supplying said mass with separate streams of said recovered catalyst in various degrees of subdivision including particles of extreme fineness, and mixing a portion only of said catalyst from said mass, containing particles larger than those of extreme fineness, with said particles of extreme fineness at a point adjacent their point of separation and prior to their discharge to said process of hydrocarbon conversion, whereby the flow characteristics of said particles of extreme fineness are improved and the maintenance of the mass in fluidized condition is facilitated.

6. In the recovery of catalyst of the finely divided type adapted for use in fluidized condition for the conversion of hydrocarbon oils, the improvement which comprises passing the catalyst suspended in a gasiform fluid through a series of catalyst separating zones, passing into a collecting zone separated catalyst in progressively finer condition from each of said separating zones, the catalyst from the last separating zone being of extreme fineness, maintaining catalyst in said collecting zone in fluidized condition, and mixing a small portion only of the catalyst from said collecting zone with the extremely finely divided catalyst separated in the last of said series of separating zones, said mixing being effected at a point adjacent the point of separation of said particles of extreme fineness and outside said collecting zone, to improve the flow characteristics of said particles of extreme fineness prior to passing them into the collecting zone.

7. Process of maintaining a fluidized mass of finely divided solids in a collecting zone, comprising continuously introducing into the mass a stream of fluidizing gas, recovering in a plurality of stages finely divided solids carried from the mass by said gas, the particles collected in the last of said plurality of stages being in extremely finely divided condition, returning as such to the mass of fluidized solid the finely divided solids recovered in the first of said plurality of stages, continuously withdrawing from said mass of fluidized solids a part only thereof containing particles of larger size than the extremely finely divided particles collected in the last of said plurality of stages, commingling said part with said extremely finely divided particles adjacent the point of separation of the latter, and passing the resulting flowable mixture of particles from a point outside the collecting zone through a conduit and into said zone at a point spaced from the point of withdrawal of said part of the fluidized mass.

8. Process of maintaining a fluidized mass of finely divided solids in a collecting zone, comprising continuously introducing into the mass a stream of fluidizing gas, recovering in a plurality of stages finely divided solids carried from the mass by said gas, the particles collected in the last of said plurality of stages being in extremely finely divided condition, returning as such to the mass of fluidized solid the finely divided solids recovered in the first of said plurality of stages, continuously commingling solid particles of larger size than the extremely finely divided particles collected in the last of said plurality of stages with said extremely finely divided particles adjacent the point of separation of the latter, and passing the resulting flowable mixture of particles from a point outside the collecting zone through a conduit and into said collecting zone.

9. In the recovery of catalyst of the finely divided type adapted for use in fluidized condition for the conversion of hydrocarbon oils, the improvement which comprises passing the catalyst suspended in a gasiform fluid through a series of catalyst separating zones, passing into a collecting zone separated catalyst in progressively finer condition from each of said separating zones, the catalyst from the last separating zone being of extreme fineness, and mixing catalyst comprising coarser particles with the extremely finely divided catalyst separated in the last of said series of separating zones, said mixing being effected at a point adjacent the point of separation of said particles of extreme fineness and outside said collecting zone, to improve the flow characteristics of said particles of extreme fineness prior to passing them into the collecting zone.

10. In a process for recovering finely divided catalyst of varying particle sizes from a gas stream leaving a contacting zone, the improvement which comprises passing the catalyst suspended in a gas stream through at least one separating zone capable of separating a relatively coarse fraction of said catalyst from said gas stream, thereafter passing the gas stream containing the remaining portion comprising relatively fine catalyst through a final separating zone capable of separating a fine fraction of catalyst therefrom, intermixing relatively coarse catalyst initially separated from said gas stream with the fine fraction separated in the final separating zone immediately adjacent the point of separation of the fine fraction, maintaining a vertical column of said intermixture of catalyst particles of a height sufficient to develop a pressure at the base of said column at least sufficient to restore the pressure lost during passage of said gas stream through said separating zones, adding said intermixture of catalyst particles to the top of said column and discharging said intermixture from the base of said column at an increased pressure for return to said contacting zone.

11. In the recovery of catalyst of the finely divided type adapted for use in fluidized condition for the conversion of hydrocarbon oils, the improvement which comprises passing the catalyst suspended in a gasiform fluid through a series of catalyst separating zones, passing into a collecting zone separated catalyst in progressively finer condition from each of said separating zones, the catalyst from the last separating zone being of extreme fineness, and mixing a small portion only of the catalyst from said collecting zone with the extremely finely divided catalyst separated in the last of said series of separating zones, said mixing being effected at a point adjacent the point of separation of said particles of extreme fineness and outside said collecting zone, to improve the flow characteristics of said particles of extreme fineness prior to passing them into the collecting zone.

12. In a system for the regeneration of finely divided catalyst particles by burning contaminants therefrom and separating regenerated catalyst particles from the regeneration gases, the steps which comprise passing a stream of hot regenerated catalyst suspended in regeneration gases through at least one separating zone capable of separating a relatively coarse fraction of said catalyst from said gas stream, thereafter cooling the gas stream containing the remaining portion of catalyst particles comprising relatively fine catalyst and passing the cooled stream through a final separating zone capable of separating a fine fraction of catalyst therefrom, intermixing the relatively hot coarse catalyst initially separated from said gas stream with the cooled fine catalyst fraction separated in the final separating zone immediately adjacent the point of separation of the fine fraction, maintaining a vertical column of said intermixture of a height sufficient to develop a pressure at the base of said column at least sufficient to restore the pressure lost during passage of said gas stream through said separating zones, adding said admixture to the top of said column and discharging said intermixture from the base of the column for return to the system.

13. In a system for the regeneration of finely divided catalyst particles by burning contaminants therefrom and separating regenerated catalyst particles from the regeneration gases, the steps which comprise passing a stream of hot regenerated catalyst suspended in regeneration gases through at least one separating zone capable of separating a relatively coarse fraction of said catalyst from said gas stream, thereafter cooling the gas stream containing the remaining portion of catalyst particles comprising relatively fine catalyst and passing the cooled stream through a final electric precipitation zone capable of separating a fine fraction of catalyst therefrom, intermixing the relatively hot coarse catalyst initially separated from said gas stream with the cooled fine catalyst fraction separated in the final separating zone immediately adjacent the point of separation of the fine fraction, maintaining a vertical column of said intermixture of a height sufficient to develop a pressure at the base of said column at least sufficient to restore the pressure lost during passage of said gas stream through said separating zones, adding said admixture to the top of said column and discharging said intermixture from the base of the column for return to the system.

14. Process of maintaining a fluidized mass of finely divided catalytic material to be used as a source of supply of catalyst for the conversion of hydrocarbon oils, comprising continuously introducing into the mass of catalyst a stream of fluidizing gas, supplying said mass with catalyst in varying degrees of subdivision including relatively large particles and particles of extreme fineness, recovering in a plurality of separating stages and as separate streams catalyst carried off by said gas, the catalyst separated in the first stage comprising larger particles than those of extreme fineness recovered in the last stage and being returned to said mass as a separate stream, mixing a portion only of said catalyst from said mass containing particles larger than those of extreme fineness with said particles of extreme fineness at a point adjacent their point of separation prior to their discharge to said process of hydrocarbon conversion whereby the flow characteristics of said particles of extreme fineness are improved.

15. In a system for the regeneration of finely divided catalyst particles by burning contaminants therefrom and separating regenerated catalyst particles from the regeneration gases, the steps which comprise passing a stream of hot regenerated catalyst suspended in regeneration gases through at least one separating zone capable of separating a relatively coarse fraction of said catalyst from said gas stream, thereafter cooling the gas stream containing the remaining portion of catalyst particles comprising relatively fine catalyst and passing the cooled stream through a final electric precipitation zone capable of separating a fine fraction of catalyst therefrom, intermixing relatively hot coarse catalyst initially separated from said gas stream with the cooled fine catalyst fraction separated in the final separating zone immediately adjacent the point of separation of the fine fraction and returning said intermixture to the system.

ROBERT W. KREBS.

REFERENCES CITED

The following references are of record in the file of this patent:

UNITED STATES PATENTS

| Number | Name | Date |
|---|---|---|
| 1,298,409 | Schmidt | Mar. 25, 1919 |
| 1,446,778 | Witte | Feb. 27, 1923 |
| 1,508,331 | Huber | Sept. 9, 1924 |
| 1,553,539 | Kinyon | Sept. 15, 1925 |
| 1,970,405 | Thomas | Aug. 14, 1934 |
| 1,997,125 | Soyez et al. | Apr. 9, 1935 |
| 2,037,090 | Pough | Apr. 14, 1936 |
| 2,231,424 | Huppke | Feb. 11, 1941 |
| 2,273,075 | Weems, 3rd | Feb. 17, 1942 |
| 2,302,209 | Goddin, Jr. | Nov. 17, 1942 |
| 2,302,328 | Kelly | Nov. 17, 1942 |
| 2,322,019 | Hemminger | June 15, 1943 |
| 2,325,516 | Holt et al. | July 27, 1943 |
| 2,326,705 | Thiele et al. | Aug. 10, 1943 |
| 2,337,684 | Scheineman | Dec. 28, 1943 |
| 2,347,682 | Gunness | May 2, 1944 |
| 2,373,008 | Becker | Apr. 3, 1945 |